United States Patent
Cobb et al.

(10) Patent No.: US 10,384,432 B2
(45) Date of Patent: Aug. 20, 2019

(54) HIERARCHICAL LAMINATES FABRICATED FROM MICRO-SCALE, DIGITALLY PATTERNED FILMS

(71) Applicant: PALO ALTO RESEARCH CENTER INCORPORATED, Palo Alto, CA (US)

(72) Inventors: Corie Lynn Cobb, Mountain View, CA (US); David Mathew Johnson, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 549 days.

(21) Appl. No.: 15/047,932

(22) Filed: Feb. 19, 2016

(65) Prior Publication Data
US 2017/0239929 A1    Aug. 24, 2017

(51) Int. Cl.
| | | |
|---|---|---|
| B32B 3/30 | (2006.01) | |
| B32B 37/14 | (2006.01) | |
| B32B 37/12 | (2006.01) | |
| B32B 7/12 | (2006.01) | |
| B32B 3/10 | (2006.01) | |
| B32B 15/04 | (2006.01) | |
| B32B 27/08 | (2006.01) | |

(Continued)

(52) U.S. Cl.
CPC .............. *B32B 37/14* (2013.01); *B32B 3/10* (2013.01); *B32B 3/12* (2013.01); *B32B 3/30* (2013.01); *B32B 7/05* (2019.01); *B32B 7/12* (2013.01); *B32B 15/04* (2013.01); *B32B 27/08* (2013.01); *B32B 27/18* (2013.01); *B32B 37/12* (2013.01); *B32B 2250/42* (2013.01); *B32B 2264/108* (2013.01); *B32B 2307/50* (2013.01); *B32B 2307/54* (2013.01); *B32B 2307/558* (2013.01); *Y10T 428/24802* (2015.01)

(58) Field of Classification Search
CPC ............................................. Y10T 428/24802
See application file for complete search history.

(56) References Cited

U.S. PATENT DOCUMENTS

| | | | | |
|---|---|---|---|---|
| 5,842,276 | A | * | 12/1998 | Asher ................... B26D 1/553 29/897.32 |
| 7,232,605 | B2 | | 6/2007 | Burgueno et al. |

(Continued)

FOREIGN PATENT DOCUMENTS

| | | |
|---|---|---|
| WO | 2007046772 A1 | 4/2007 |
| WO | 2009002644 A2 | 12/2008 |
| WO | 2009085362 A2 | 7/2009 |

OTHER PUBLICATIONS

Lakes, Roderic, "Materials with structural hierarchy," Nature, 361:511-514 (Feb. 11, 1993).

(Continued)

*Primary Examiner* — Gerard Higgins
(74) *Attorney, Agent, or Firm* — Miller Nash Graham & Dunn LLP

(57) ABSTRACT

A method of manufacturing a hierarchical laminate including forming a first hierarchical film, coating the first hierarchical film with an adhesive, stacking a second hierarchical film on the first hierarchical film, and curing the adhesive. A laminate structure has at least two electrohydrodynamic patterned film layers, the at least two layers being aligned and bonded.

10 Claims, 14 Drawing Sheets

(51) Int. Cl.
*B32B 27/18* (2006.01)
*B32B 3/12* (2006.01)
*B32B 7/05* (2019.01)

(56) References Cited

U.S. PATENT DOCUMENTS

| | | |
|---|---|---|
| 7,472,637 B2 | 1/2009 | Sarva et al. |
| 2011/0250427 A1 | 10/2011 | Kotov et al. |
| 2013/0189028 A1 | 7/2013 | Gershenfeld et al. |
| 2014/0352232 A1* | 12/2014 | Malakauskas ...... E04B 1/34869 52/79.9 |
| 2015/0021161 A1 | 1/2015 | Johnson et al. |
| 2015/0022790 A1 | 1/2015 | Johnson et al. |
| 2015/0367540 A1 | 12/2015 | Johnson et al. |

OTHER PUBLICATIONS

Doty et al., Hierarchical Polymer Microlattice Structures, Adv. Eng. Mater. 14(7):503-507 (2012).
Schaedler et al., "Ultralight Metallic Microlattices," Science, 334, 962 (2011).
Goldberg-Oppenheimer, et al., "Carbon Nanotube Alignment via Electrohydrodynamic Patterning of Nanocomposites," Adv. Funct. Mater., 21:1895-1901 (2011).
Dimas, Leon Sokratis Scheie, Bio-inspired composites—a de novo approach to the conceptualization, design, and synthesis of tough mesoscale structures with simple building blocks, Department of Civil and Environmental Engineering, Mass. Inst. Tech. (Jan. 18, 2013).
European Search Report, EP17155909.9, dated Jul. 14, 2017, 8 pp.

* cited by examiner

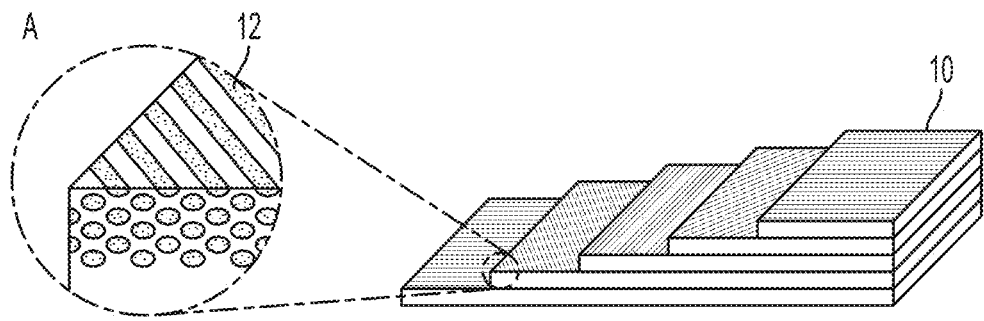
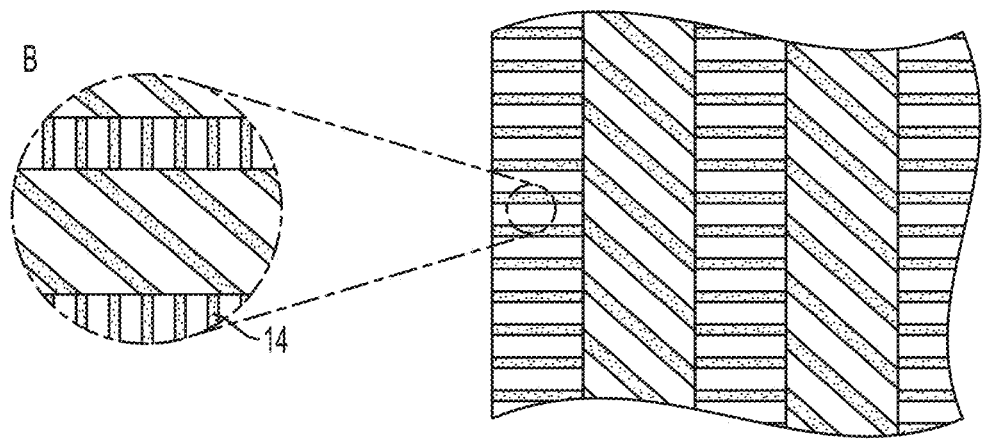
FIG. 1
PRIOR ART

US 10,384,432 B2

HIERARCHICAL LAMINATES FABRICATED FROM MICRO-SCALE, DIGITALLY PATTERNED FILMS

STATEMENT REGARDING FEDERALLY SPONSORED RESEARCH AND DEVELOPMENT

This invention made with Government support under HR0011-14-C-0036 awarded by DARPA. The Government has certain rights in this invention.

FIELD OF THE INVENTION

This disclosure relates to electrohydrodynamic (EHD) film patterning, more specifically to EHD fabricated hierarchical materials.

BACKGROUND

Hierarchical, architected materials have the potential to transform military applications, providing components that simultaneously offer the best performance attributes of ceramics, metals, and plastics. Hierarchical materials concurrently realize function features on multiple length scales, for example from sub-micron up to a millimeter level. This allows large void space in a material structure to be filled with load bearing members, adding compliance to the material without significantly increasing the density.

Prior art fabrication techniques typically have limitations to a single size range and cannot realize hierarchical structure over a sufficient range of scales to reduce material brittleness without sacrificing material strength. Additionally, the few fabrication processes that do allow fabrication of hierarchical structures at multiple length scales do not scale to large area production, limiting the integration of hierarchical materials into design components for military and defense applications.

SUMMARY

One embodiment consists of a method of manufacturing a hierarchical laminate including forming a first hierarchical film, coating the first hierarchical film with an adhesive, stacking a second hierarchical film on the first hierarchical film, and curing the adhesive.

Another embodiment consists of a laminate structure has at least two electrohydrodynamic patterned film layers, the at least two layers being aligned and bonded.

BRIEF DESCRIPTION OF THE DRAWINGS

FIG. 1 shows an example of an existing hierarchical laminate.

DETAILED DESCRIPTION OF THE EMBODIMENTS

Figure 2:
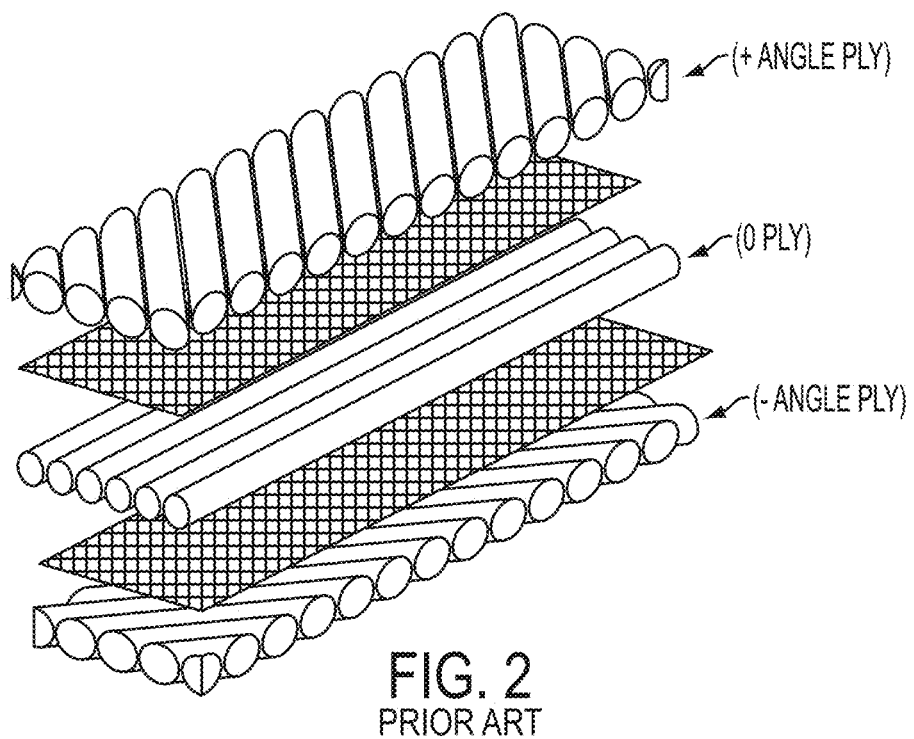
FIG. 2 shows an example of unidirectional single layers used to fabricate a composite laminate.

Most composite laminates are constructed at a macroscopic level, such as at millimeter or greater levels, and involve uni-directional single material layers as shown in FIG. 1 and FIG. 2. FIG. 1 shows an example of existing laminates 10. These single material layers often consist of fibers embedded in a polymer matrix and these individual layers are oriented at various angles relative to each other for form an anisotropic, composite laminate, as shown in exploded views 12 and 14. See for example, Lakes, Roderick "Materials with Structural Hierarchy," *Nature*, vol. 361, pp. 511-514 (Feb. 11, 1993), as in FIG. 1, and US Patent Publication, US20110250427 as in FIG. 2.

Researchers have looked to biology to find additional extrinsic toughing mechanisms which can help yield more crack resistant composite materials without compromising on material strength. Bone, nacre, and wood all exhibit a hierarchy of structure ranging from the nanometer- to millimeter-scale composed of material building blocks that enable strong, rough and lightweight structures.

Similarly, bone and wood both exhibit a material hierarchy at multiple levels enabling crack bridging and deflection along specific fiber regions through controlled fiber orientation and reinforcement. An important attribute of these hierarchical biomaterials that can mitigate crack propagation is that they contain features spanning multiple length scales, utilizing a stiff constituent for strength and soft constituent for compliance, allowing the overall structure to absorb more deformation energy prior to fracture. Alternatively, the methods used to fabricate the structures cannot scale to meaningful production quantities.

Figure 3:
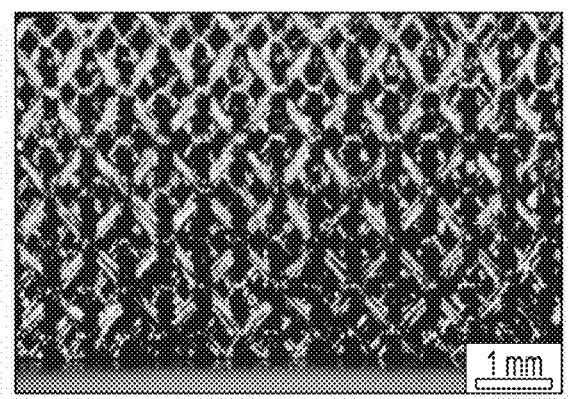
FIGS. 3-5 show examples of hierarchical materials.
Figure 4:
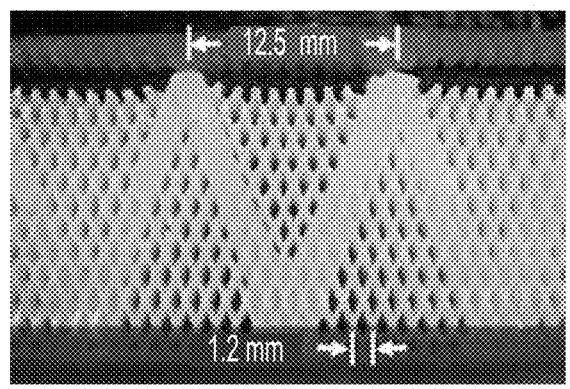
Figure 5:
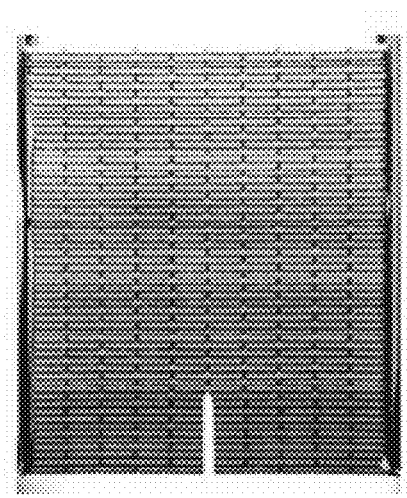

Three dimensional (3D) printing has been used to fabricate a bone-like structure as shown in FIGS. 3-5. FIG. 3 shows a nickel lattice, FIG. 4 shows a hierarchical polymer lattice, and FIG. 5 shows a 3D printed 2-material structure from Dimas, Leon, "Bio-Inspired Composites: A de novo Approach to the Conceptualization, Design and Synthesis of Touch Mesoscale Structures with Simple Building Blocks," http://hdl.handle.net/1721.1/79497. However, the implementation lacked the length scales and levels needed to properly experimentally evaluate the structures. Although 3D printing processes and lay down multiple materials, they are limited in their resolution (often around a few hundred microns) and structure uniformity.

HRL Laboratories has used its self-propagating wave guide technique to fabricate 3D hierarchical and architected trusses. Doty, et al. (R. E. Doty, J. A. Kolodziejska, and A. J. Jacobsen, "Hierarchical Polymer Microlattice Structures," *Adv. Eng. Mater.*, 14 (2012)), fabricated hierarchical polymer lattice structures using a self-propagating wave guide technique. The trusses, similar to those in FIGS. 3-5, are limited to a millimeter scale and uniformity and co-planarity issues were encountered with imperfections in the hierarchical lattice design, causing some anomalies in the compressive response of the material. Schaedler, et al. (T. A. Schaedler, A. J. Jacobsen, A. Torrents, A. E. Sorensen, J. Lian, J. R. Greer, L. Valdevil, W. B. Carter, "Ultralight Metallic Microlattices," *Science,* 334 (2011)), created ultralightweight metallic microstructures with densities on the order of 0.9 mg/cc.

Hierarchical composite structures which truly span a range of length scales can revolutionize how one engineers and design composite materials by enabling better control over material alignment and interfacing at a nano- or micron-level. These architectures can help mitigate many of the flaws and failure modes introduced into conventional macro-scale composite materials. The aforementioned works have shown qualitatively the benefits that can potentially be realized from hierarchical material structures as hierarchy helps reinforce material structure and distribute deformation energy.

However, in contrast to these surveyed fabrication methods, the electrohydrodynamic thin film patterning (abbreviated here as EHD-FP) has the ability to concurrently resolve sub-micron and mm scale features, enabling true fabrication of hierarchical material structures in production worthy quantities. Our vision for achievable large-area manufacturing of hierarchical structures will enable a new generation of materials which are simultaneously tough, strong, lightweight, and can operate in harsh environments.

The embodiments here encompass a novel EHD-FP process that draws on expertise in roll-to-roll processing enabling a manufacturing process that can easily scale up to production worthy speeds for creating large area patterned hierarchical films. By taking advantage of UV crosslinking, the process patterns films with low viscosity and at speeds on the order of seconds, while creating final materials with more desirable material properties than their bulk counterparts. Patterning with the EHD-FP process has the unique ability to create an ordered structure of materials by forcing the alignment of nanoparticles dispersed within the uncured polymer film (P. Goldberg-Oppenheimer, D. Eder, U. Steiner, "Carbon Nanotube Alignment via Electrohydrodynamic Patterning of Nanocomposites," *Adv. Funct. Mater.,* 21 (2011)). B combining this ability with the already micron-level resolution of the process, materials could potentially be created which span scales from hundreds of nanometers to millimeters.

Figure 6:
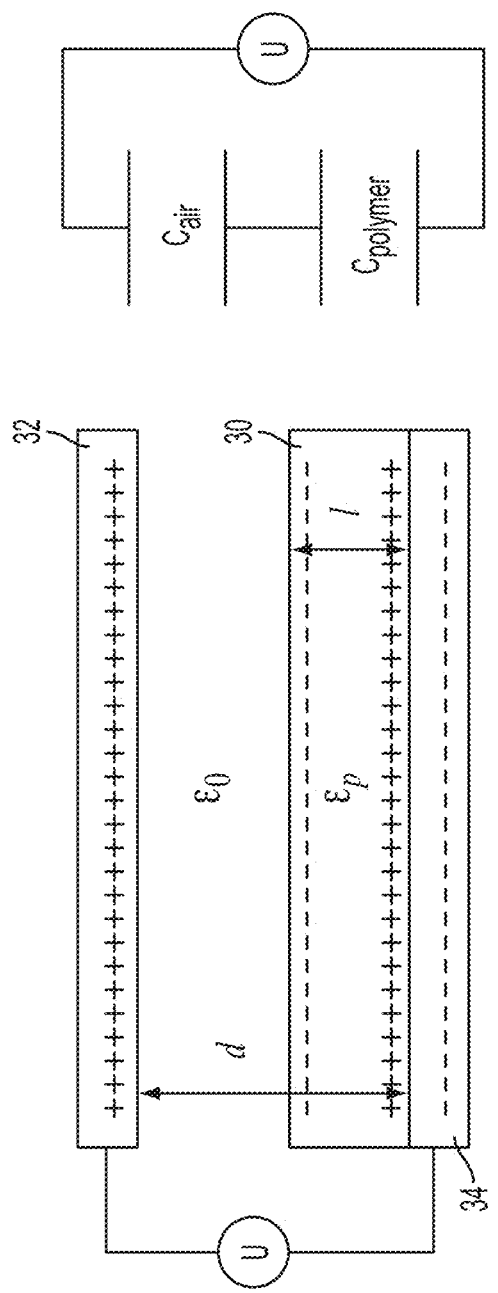
FIG. 6 shows a schematic of the liquid film sandwiched between two electrodes and an equivalent electronic circuit model.

PARC's EHD-FP process is based on the principle of electrohydrodynamic film instability found in literature, shown in FIG. 6. EHD-FP works by creating an electrical charge at the boundary of two fluids, leading to pressure gradient across the fluid interface and resulting in deformation of the surface of the fluid 30. The electrodes 32 and 34 create the charge at the boundary. The film surface profile is determined by a balance of the electrical force and surface tension. Under certain processing conditions, the electrohydrodynamic force leads to instabilities that can be used to create micro-sized patterns intrinsic to the specific properties of a system.

In the presence of a patterned electrode, the surface deformation mirrors that of the electrode shape. The dynamics and required operational parameters to create a patterned film can be straightforwardly estimated. In the case of thin films, where the height of the film 1 is much less than the length scale of the instability $\lambda$, the emerging pattern is driven by the fastest is driven by the fastest growing capillary wave mode. The time scale ($T_m$) is governed by the below equation:

$$\tau_m = \frac{3\mu\gamma U^2}{\beta \varepsilon_0^2 \varepsilon_p^2 (\varepsilon_p - 1)^4} E_p^{-6}.$$

and is depending upon the dielectric constants $\varepsilon_o$, and $\varepsilon_p$, viscosity $\mu$, height l, and the surface tension $\gamma$ of the liquid film and the applied voltage U, electrode distance d and the electric field in the polymer as given by the below equation:

$$E_p = \frac{U}{\varepsilon_p d - (\varepsilon_p - 1)l}.$$

In practice, the embodiments here result in EHD-FP patterned films in a few seconds with gaps on the order of tens of microns.

Figure 7:
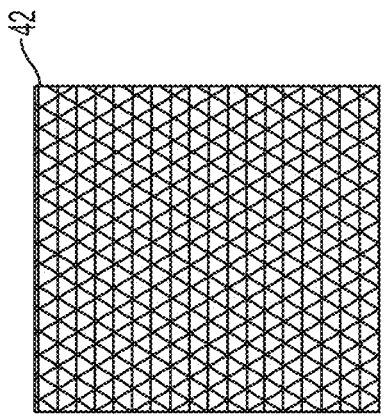
FIGS. 7-12 show embodiments of single layer level truss structures.
Figure 10:
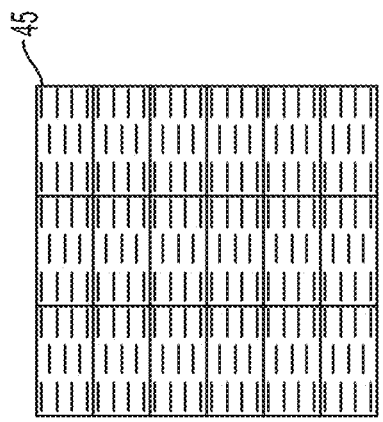
Figure 8:
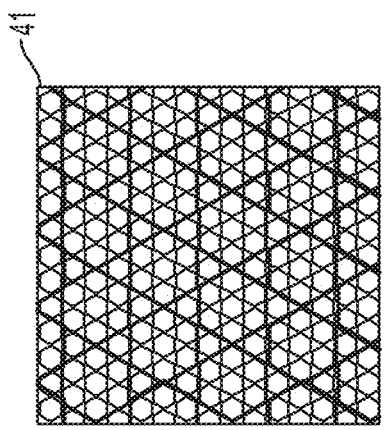
Figure 11:
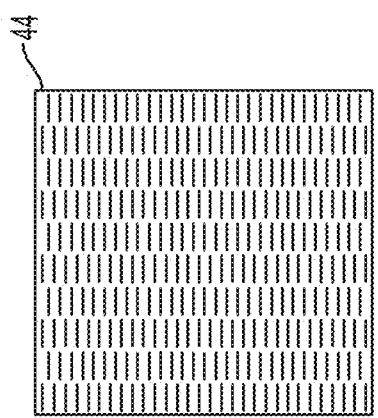
Figure 9:
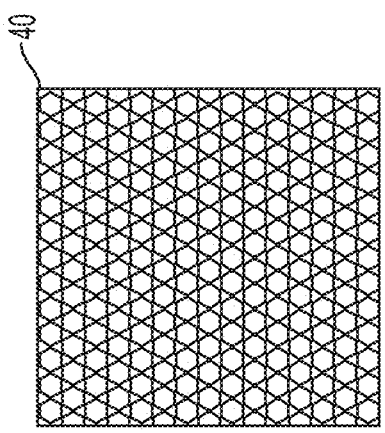
Figure 12:
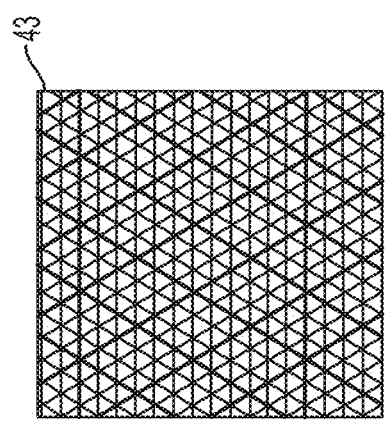

FIGS. 7-12 show a web of EHD-FP patterned hierarchical materials can be cut into building block sheets which can then be stacked in a multitude of combinations to achieve multi-layer laminates that have finite thickness. These laminates have many of the processing and design advantages of current fiber-reinforced polymer composites with enhance weight, toughness, and strength benefits that are on the order of 20× greater than bulk constituents. FIG. 7 shows a single layer 1-level Kagome truss structure 40. FIG. 8 shows a single layer 2-level Kagome truss structure 41. FIG. 9 shows a single layer 1-level triangular truss structure 42. FIG. 10 shows a single layer 2-level triangular truss structure 43. FIG. 11 shows a single layer 2-level bone-like material 44. FIG. 12 shows a single layer 3-level bone-like material 45.

Figure 13:
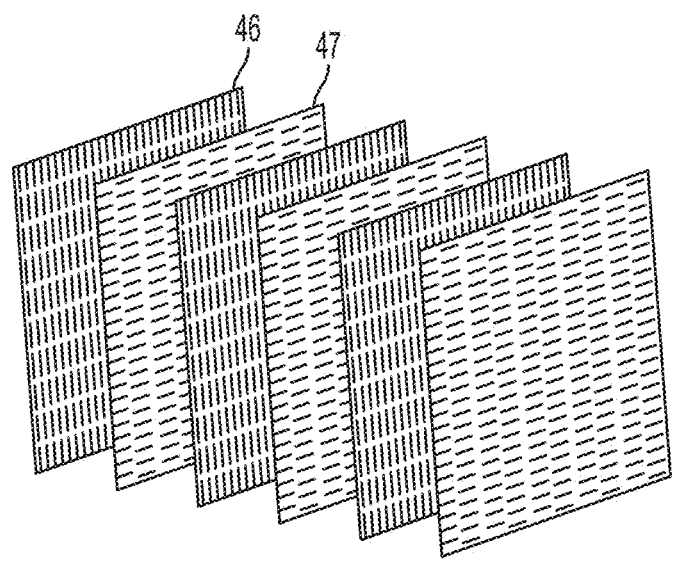
FIGS. 13-14 show embodiments of stacked hierarchical film structures.
Figure 14:
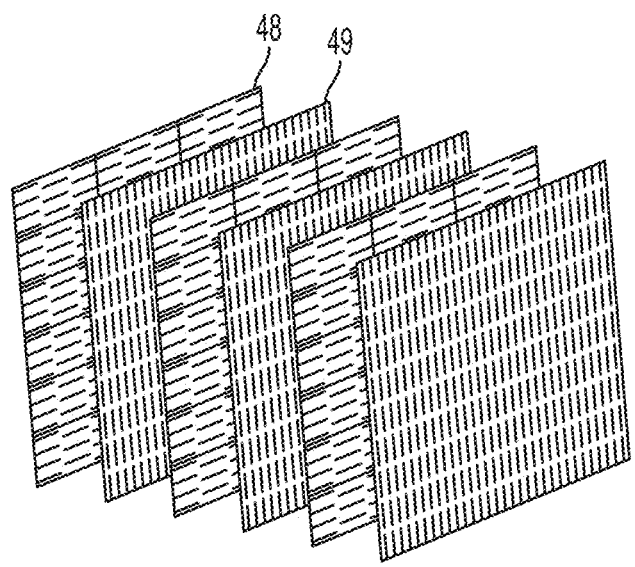

FIGS. 13 and 14 show multi-layer laminates from different types of films. FIG. 13 shows an example of a multilayer laminate composed of 2-level hierarchical material layers 46 and 47 at 0 and 90 degrees. One should note that these films are single layer films, but with multiple levels. FIG. 14 shows a multilayer laminate composed of 2- and 3-level hierarchical material layers 49 and 48 with 0 and 90 degrees.

Hierarchical laminate structures are composites that will increase overall material toughness, resistance to cracking, and strength, relative to single layer hierarchical films. The embodiments here stack substantially 2D EHD-FP films to produce 3D structures.

In one embodiment, a doctor blade can coat the structure with a suitable epoxy in order to fabricate a 2-ply minimum hierarchical composite structure. Use of UV or slow cure adhesives allow control of the curing process and minimize the likelihood of failure of a stack up. Embodiments here produce 2D EHP-FP films using a thin epoxy layer or other bonding agent. The doctor blade application helps produce a consistent epoxy thickness. After the epoxy is applied, the process stacks at least two patterned films on top of each other. After the epoxy cures, a hierarchical composite laminate structure results.

Figure 15:
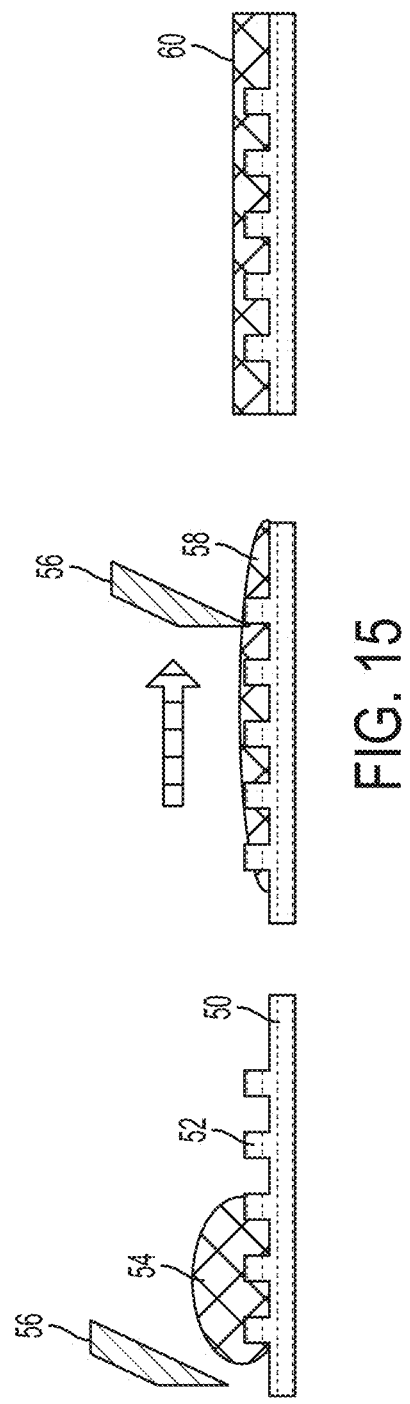
FIG. 15 shows an embodiment of a doctor blading process.

FIG. 15 shows an example of this process. A first hierarchical film 50 having upon it a pattern 52 receives an amount of adhesive or bonding agent 54. This is then spread by the doctor blade 56. The even layer 58 is then cured and forms another layer 60. Using a doctor blade to cover hierarchical structures in a thin epoxy layer introduces a compliant layer to the structure that may have an impact on the mechanical results. However it is only likely to have positive impact on toughness. If the lattice structures such as those shown in FIGS. 7-12 are used, filling in the void spaces with epoxy may negatively or positively affect the stretching deformation of the individual truss struts.

If a negative impact to toughness and strength is observed with the doctor blade method, an alternative would be to apply epoxy to only the contact points between the 2D lattice layers and precisely control the applied pressure. However, using a doctoring blade is a faster approach and is more likely to yield consistent results. Using a doctor blade reduces the need for high precision registration of the features from one layer to another. The process will align each by stacking the layers on top of each other with optical inspection methods and/or an alignment fixture. Expected alignment tolerances should reach tolerances of ±100 μm or better.

Figure 16:
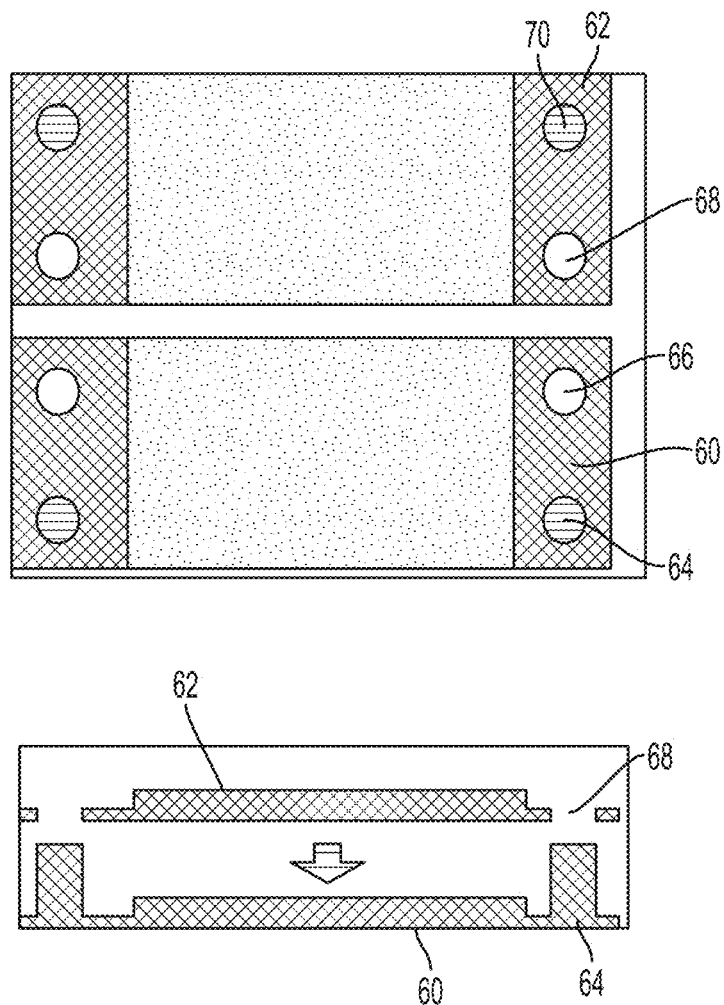
FIG. 16 shows an embodiment of holes and pillars for alignment.

To improve on the alignment of larger scale films, it will be useful to include locating features within the film itself. These features can be used in a batch or continuous process to increase the accuracy of alignment. An example of these features could be a pillar and a hole as shown in FIG. 16. The top figure in FIG. 16 shows two films 60 and 62. Film 60 has pillars such as 64 and holes 66 that will match up with pillars such as 70 and holes 68 in film 62. The bottom figure shows how the two films align on the pillars and holes.

The pillars can be created through EHD-FP patterning process, and can be raised slightly above the rest of the features by varying patterning process parameters or layout of the 3D electrode. The hole can be created accurately by punching or laser drilling. Hole locations can be alternated on each layer to ensure alignment of multiple layers. The pillars can have tapers, as are commonly produced by the EHD-FP process.

Figure 17:
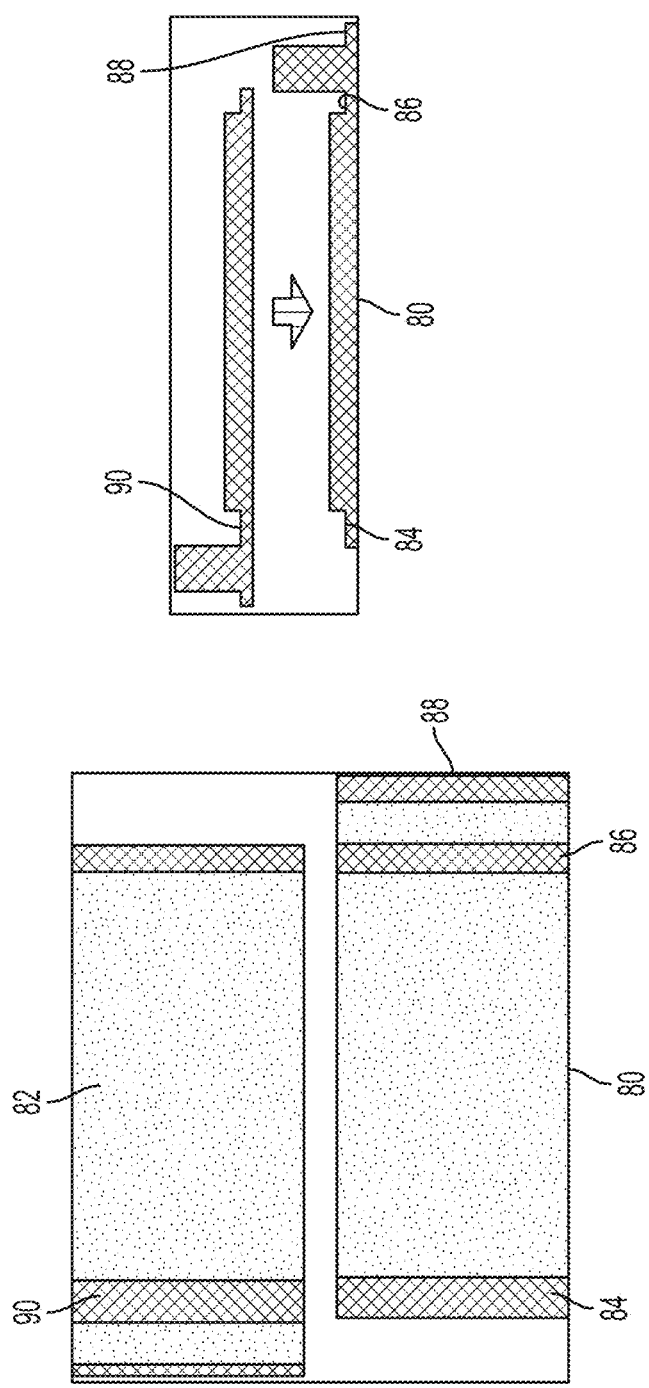
FIG. 17 shows an embodiment of holes and raised lines for alignment.

FIG. 17 shows an alternative embodiment of alignment features in a top view and a side view. The features in this embodiment consist of raised lines. Films 80 and 82 have corresponding sets of raised lines. The lines 84, 86 and 88 align with the lines such as 90 on the second film 82. The side view shows the alignment of the raised lines on film 80 with the raised lines on the other film 82. The raised lines may only provide alignment in a single direction, it may be much faster in a continuous process.

Figure 19:
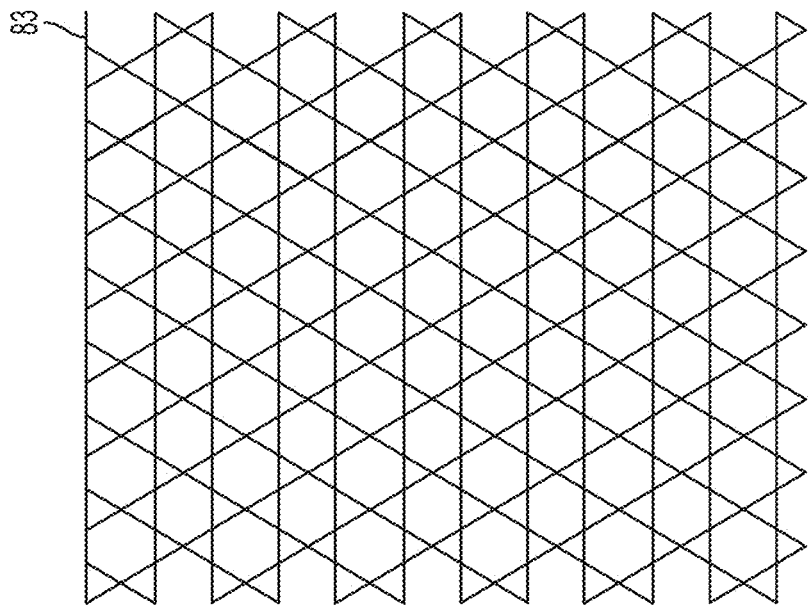
FIGS. 18-19 shows embodiments of single layer patterns.
Figure 18:
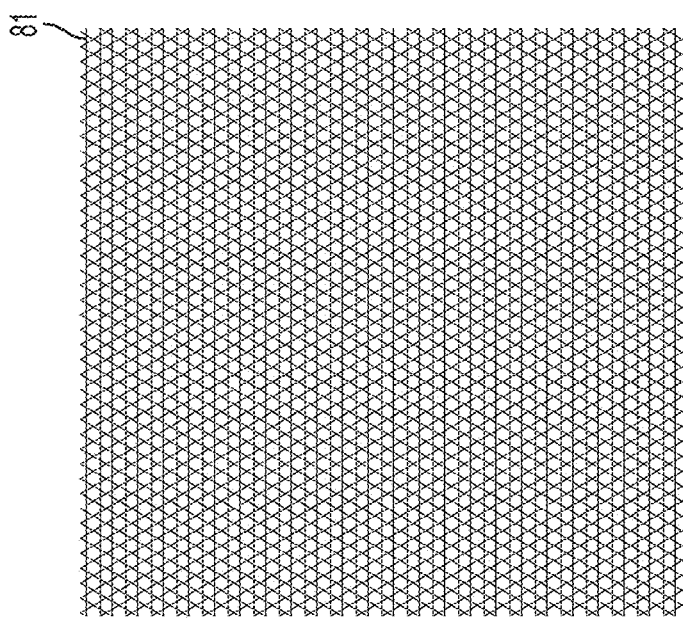
Figure 20:
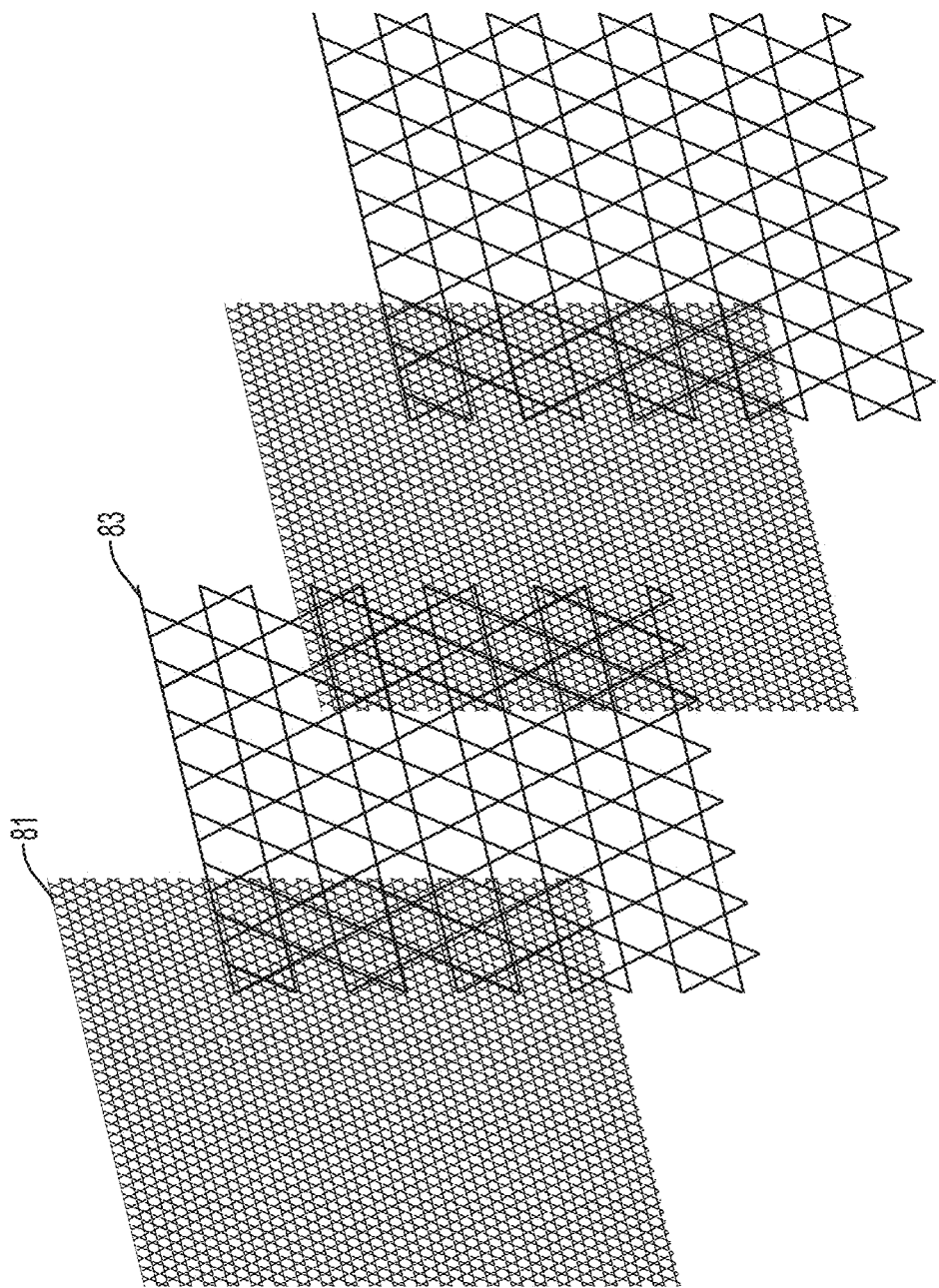
FIGS. 20-21 shows an embodiment of a multilayer structure of films having different patterns.
Figure 21:
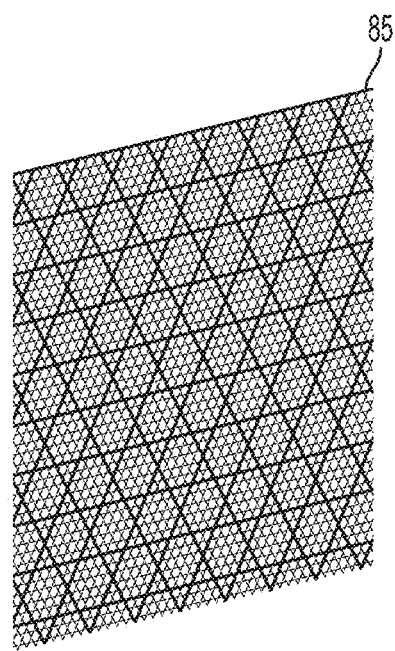
Figure 22:
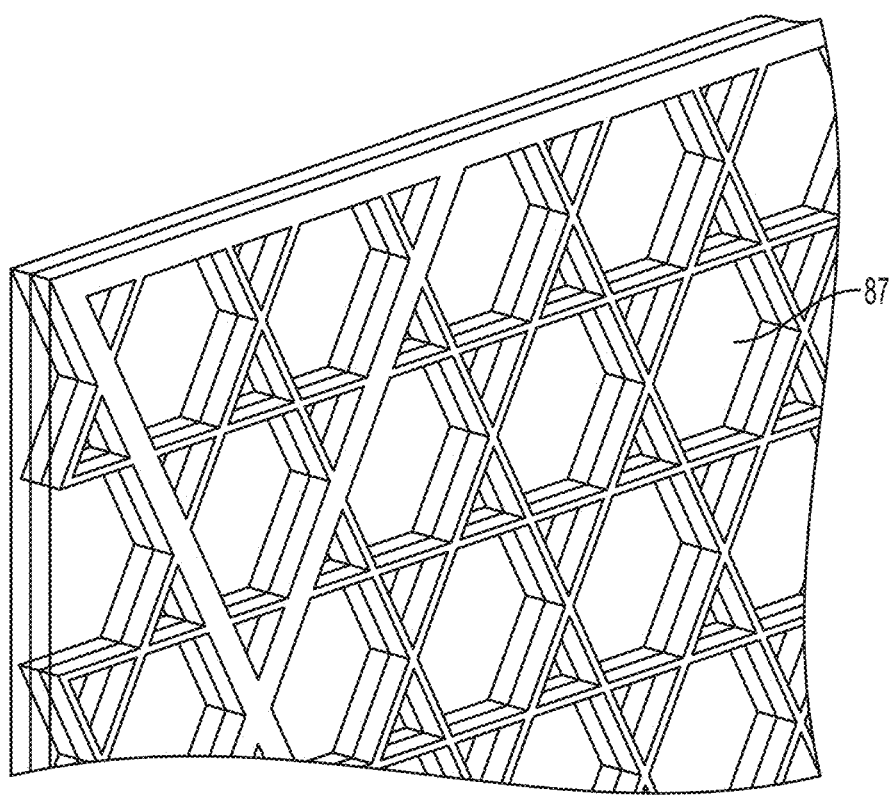
FIG. 22 shows an embodiment of a pattern filled with a bonding adhesive.

The single layers that are stacked may take many forms. FIGS. 18 and 19 show single layer Kagome patterns 81 and 83. When these patterns are alternated, as shown in FIG. 20, thicker patterns such as 85 shown in FIG. 21 result with enhanced strength and, with the addition of an adhesive, compliance. FIG. 22 shows a close up view of a Kagome pattern in which the voids, such as 87 within the pattern are fillable with a compliant adhesive.

Laminating two hierarchical films produces a thicker, stronger and possibly more compliant structure than previously achievable. The manufacture of these films may take many forms. Using roll-to-roll processes, such as those disclosed in US Patent Publications 20150022790 and 20150021161, commonly assigned to the assignee of the instant application and incorporated by reference herein in their entirety, allows for fast manufacture of these films.

Figure 23:
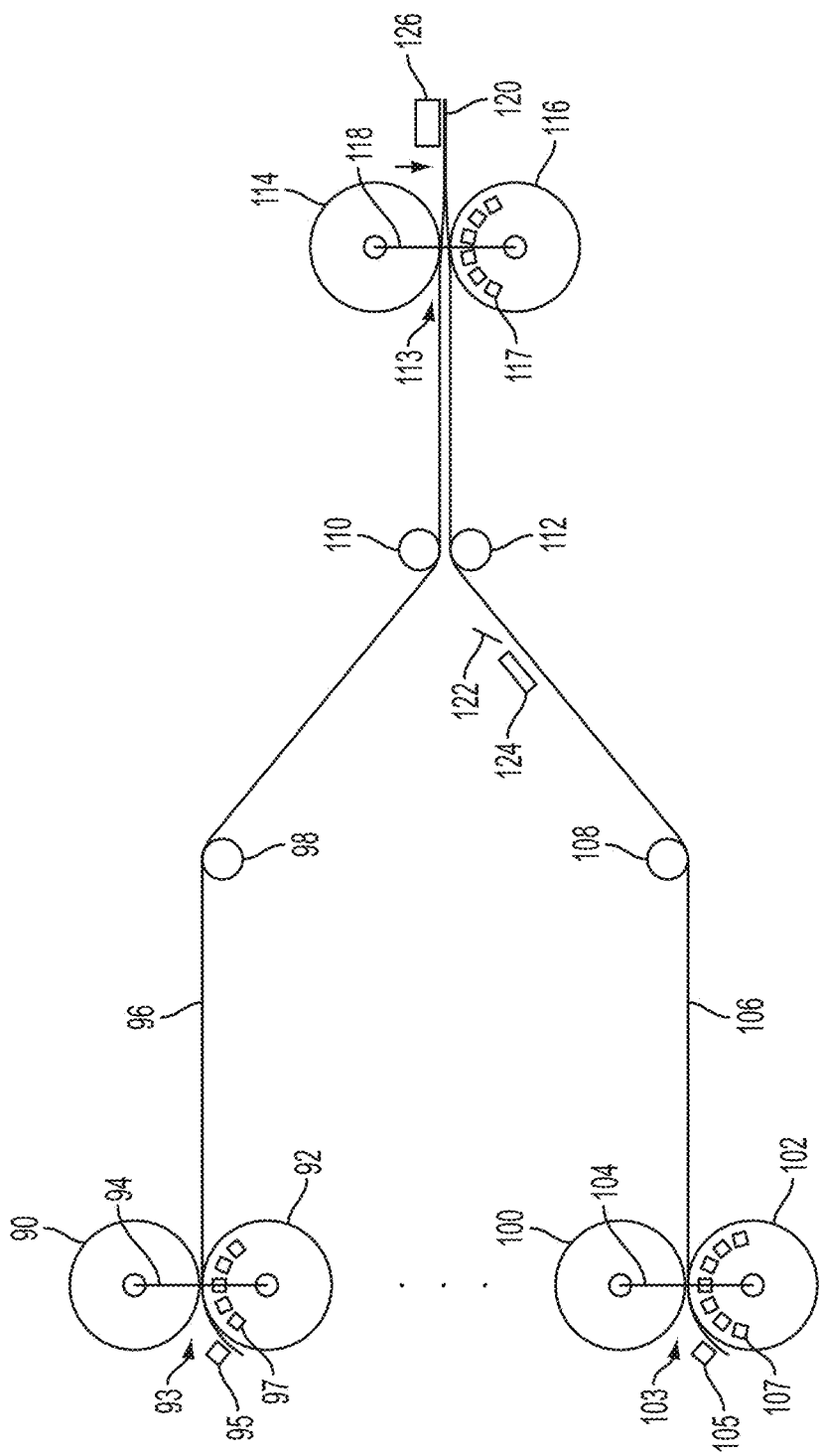
FIG. 23 shows an embodiment of a roll-to-roll system.

In these references, a liquid polymer is loaded with nanostructures such as carbon nanotubes or nanowires. As shown in FIG. 23, a lower conveyor such as roller 92 is coated with the loaded liquid polymer from slot coater or other coating mechanism 95. As the loaded liquid polymer approaches the gap 93 between the lower conveyor 92 and the upper conveyor 90, an electric field begins to act on the liquid polymer. The upper conveyor 90 has a means of generating an electric field that acts on the liquid polymer. The field causes the surface of the liquid polymer to form raised ridges and pillars. By controlling the strength of the field, the resulting film exhibits micro-scale patterned shapes in the gap 93. A support structure 94 controls the distance of the gap 93 to allow the formation of the raised structures.

Depending up on the polymer used, the lower conveyor 92 may include a curing mechanism 97 such as UV light, visible light or a focused thermal curing system. For example, if the polymer is UV curable, visible light curable or thermally curable, the lower conveyor would have a UV light source, a visible light source or a thermal curing system.

The conveyors 90 and 92 produce a single patterned film 96. In order to form the multiple film laminates discussed here, another set of conveyors such as 100 and 102, having the same or similar structures as the conveyors 90 and 92, would produce another single film 106. The lower set of conveyors 100 and 102 will have a similar structure 104 to control the gap 103, a coating element 105, and a curing mechanism 107 in the lower conveyor 102. The system of FIG. 23 could have several of these subsystems, each capable of creating a single EHD-FP film.

In order to create a laminate structure, each of these films are directed into a common manufacturing path, such as by directional rollers 98 and 108. As the paths merge, but prior to the films becoming close enough to touch, the epoxy or other adhesive may be applied by a deposition component 124 followed by a doctor blade 122, or a slot coater, etc. The two or more films would then travel along a common path established such as by rollers 110 and 112. Another set of conveyors 114-116 then form a 'nip' 113, rather than a gap. The nip is the region in which the rollers bring the two films into contact. The support structure 118 would control the pressure between the two conveyors to provide enough pressure to form a bond while avoiding cracking the films. The lower conveyor 116 may include a curing mechanism 117. Alternatively, a bonding agent may be used to fill the laminated films as discussed above, dispensed from a bonding agent repository 126. The resulting film 120 is a multi-layer laminate of individual EHP-FP films. Each film could have different patterns or materials, etc.

Other variations and modifications are possible. For example, if alignment features are used, the roller pair 110-112 could be replaced with an alignment system that aligns the features between the films. As it is a continuous process, the initial alignment would hold true for the films as they mate. The conveyors in all places used may consist of a belt system, rather than rollers.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A laminate structure, comprising:
   at least two electrohydrodynamically patterned, hierarchical film layers, each hierarchical film layer formed from a polymer film material, each hierarchical film layer having multiple levels, a different pattern, and each hierarchical film layer having alignments features comprising raised structures within each hierarchical film layer to allow the at least two film layers to align such that one film layer covers another film layer, the layers being aligned and bonded.

2. The laminate structure of claim 1, wherein the at least two hierarchical film layers are hierarchical lattice structures.

3. The laminate structure of claim 2, wherein the hierarchical lattice structures comprise structures of at least two levels.

4. The laminate structure of claim 1, wherein the laminate structure is a hierarchical structure of at least two levels.

5. The laminate structure of claim 1, wherein the at least two hierarchical film layers are bonded evenly across the at least two hierarchical film layers with an adhesive layer.

6. The laminate structure of claim 1, wherein the at least two hierarchical film layers are bonded at contact points between the at least two hierarchical film layers by applying adhesive at the contact points.

7. The laminate structure of claim 1, wherein the at least two hierarchical film layers are filled with a bonding agent.

8. The laminate structure of claim 7, wherein the bonding agent provides mechanical toughness to the laminate structure.

9. The laminate structure of claim 1, wherein the raised structures comprise at least one pillar.

10. The laminate structure of claim 1, wherein the raised structures comprise at least one raised line.

\* \* \* \* \*